No. 701,341. Patented June 3, 1902.
A. B. HOLSON.
ELECTRIC MOTOR.
(Application filed July 15, 1901.)
(No Model.) 2 Sheets—Sheet 1.
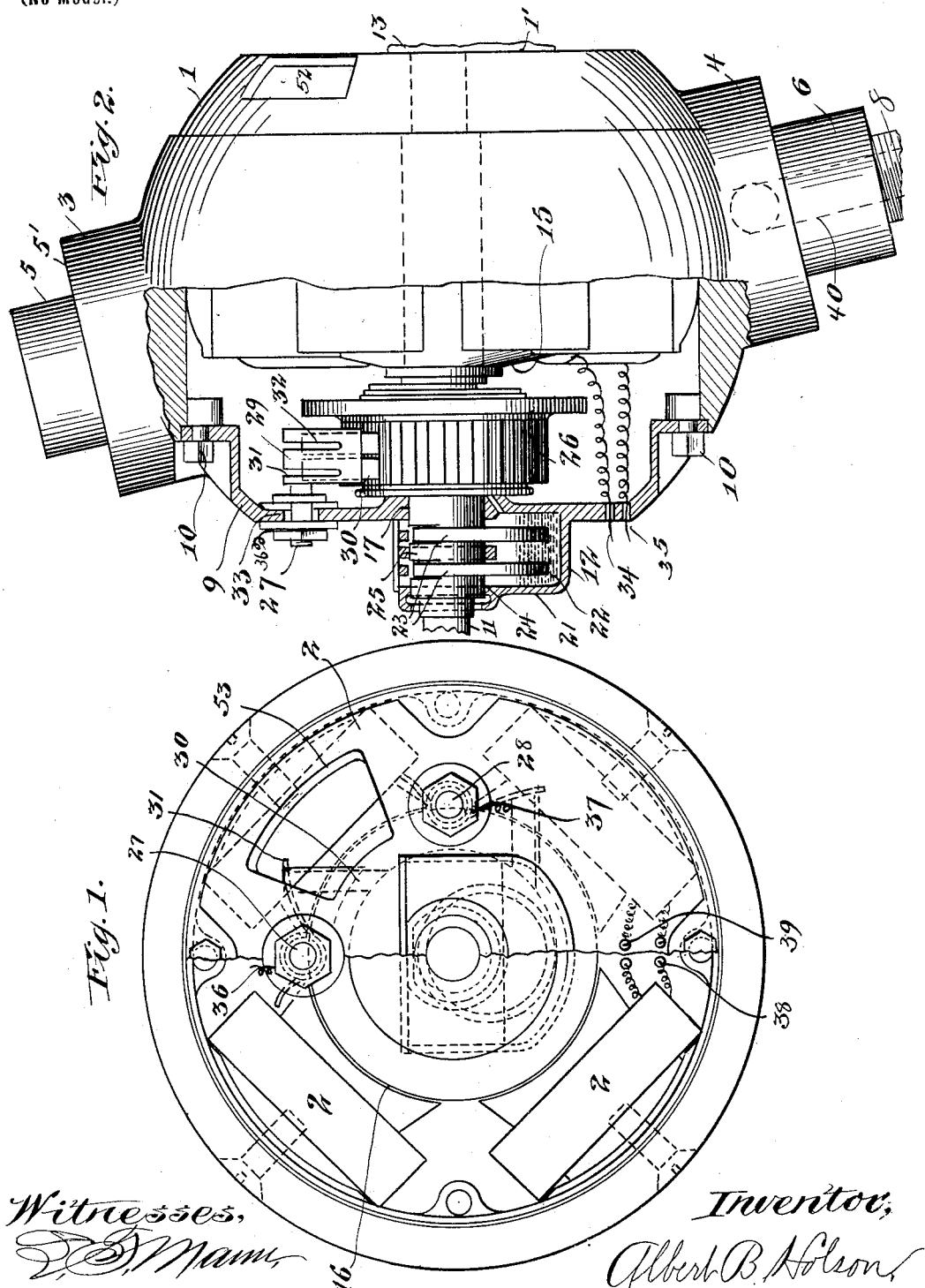

No. 701,341. Patented June 3, 1902.
A. B. HOLSON.
ELECTRIC MOTOR.
(Application filed July 15, 1901.)
(No Model.) 2 Sheets—Sheet 2.
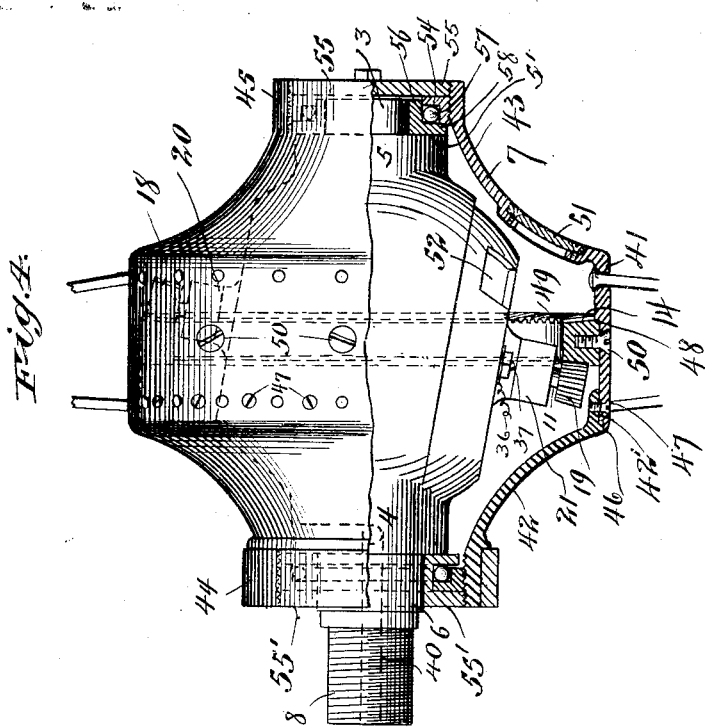
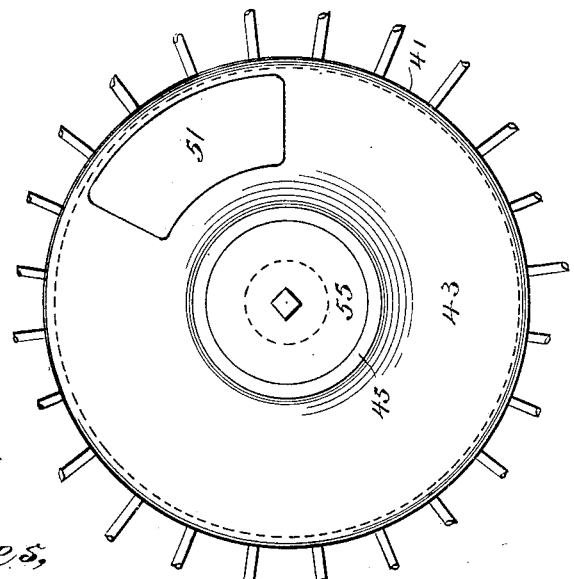
Witnesses, Inventor,
Albert B. Holson,
By Offield Towle & Linthicum
Attys.

UNITED STATES PATENT OFFICE.

ALBERT B. HOLSON, OF CHICAGO, ILLINOIS.

ELECTRIC MOTOR.

SPECIFICATION forming part of Letters Patent No. 701,341, dated June 3, 1902.

Application filed July 15, 1901. Serial No. 68,374. (No model.)

*To all whom it may concern:*

Be it known that I, ALBERT B. HOLSON, a resident of Chicago, Illinois, have invented certain new and useful Improvements in Electric Motors, of which the following is a specification.

This invention relates to improvements in electric motors of that type wherein the armature revolves within a field formed by a plurality of circumferentially-disposed field-pieces.

Among the principal objects of the invention are to provide improved means of transmitting the movement of the armature to the driven member; to provide a construction which is at once extremely compact and symmetrical and is of the self-contained type—that is, the outer framework of the motor constitutes a housing for the same; to provide improvements in the details of construction and arrangement of the journal-bearings for the several moving parts of the motor; to provide certain improved details of construction enabling the motor to be combined with a wheel-hub, and in general to provide an improved device of the character referred to.

To these ends the invention consists in the matters hereinafter described, and more particularly pointed out in the appended claims, and the same will be readily understood from the following description, reference being had to the accompanying drawings, in which—

Figure 1 is an end elevation of a motor embodying my invention, approximately one-half of the end casing being removed to expose the motor mechanism proper. Fig. 2 is a side elevation of the motor with parts of the casing broken away to expose the arrangement of the parts within. Fig. 3 is an end elevation of a wheel-hub forming a housing within which the motor is arranged and which wheel-hub is actuated by the motor, and Fig. 4 is a side elevation of the wheel-hub with parts of the hub-casing shown in axial section and showing more particularly the driving connections between the motor and the hub.

While I have herein shown the motor as embodied in a construction forming a part of a vehicle-wheel—for example, an automobile-wheel—yet it will be understood that the invention is in no wise limited to this particular application, but, on the contrary, is capable of a wide variety of applications, and, as will appear more clearly from the following description, the particular form of the outer casing or frame, while in itself novel and forming a subordinate feature of the present invention, is not an essential of the broader features of the invention, it being understood that any other suitable frame or casing could be substituted therefor.

Referring more particularly to Figs. 1 and 2, 1 designates as a whole the outer stationary member, which in the present instance is made in the form of an approximately spherical shell arranged to inclose the armature and commutator mechanism of the motor and serving also as a frame, upon the interior of which are supported the several field-pieces 2 of the motor. In the present instance, in which the motor forms the driving mechanism of a wheel, the shell member 1 is provided at diametrically opposite points with integral bosses or projections 3 4, respectively, terminating in reduced journal portions 5 6, which form the spindle portions of the axle, upon which the respective ends of the hub (designated as a whole 7) have bearing, as hereinafter more fully explained. It may be noted at this point that the journal 6 is provided with a further extension 8, adapted to be rigidly united with the main frame of the vehicle, whereby the outer casing 1 of the motor becomes as a whole the journal member or spindle of the vehicle.

As a convenient construction and in order to afford access to the interior of the shell 1 one entire end portion of the latter is made removable, being made in the form of an end cap (designated 9) suitably bolted or otherwise secured to the main body of the shell, as indicated at 10, said end cap being concentric with the main shaft 11 of the armature and being of a diameter large enough to permit the insertion of all of the several parts through the opening covered thereby.

The main shaft 11 of the armature is journaled in suitable bearings (designated as a whole 12 13) located at the respective opposite ends of the motor-shell, and in this connection it is to be observed that the axis of the main shaft of the motor is arranged in such relation to the journal portions 5 and 6 of the shell that when the latter is arranged within the wheel-hub the armature-shaft will extend transversely across the interior of the hub in a direction slightly inclined to the central plane of the wheel and intersecting the latter, as clearly indicated in Fig. 4, the object of this arrangement being to enable the armature-shaft to be geared to an annular double rack 14 in such manner as to engage both sides of the latter, as will hereinafter appear.

The armature (designated as a whole 15) may be of any suitable type, that shown herein being externally cylindrical, while the field-pieces 2 are correspondingly hollowed at their inner ends, as indicated at 16, to approach as nearly as possible the armature, there being four of said field-pieces in the present instance, which are accordingly arranged at ninety degrees apart.

The bearing 13, within which one end of the main shaft 11 of the armature is mounted, is formed directly through the end wall 1' of the motor-casing, as indicated in dotted lines, while the opposite end of the shaft is similarly supported in a bearing-aperture 17, formed through the end cap member 9. The armature-shaft is arranged to extend at both ends through and beyond the end walls of the shell and is provided at each end with a rigid pinion (designated 18 and 19, respectively) which are arranged to respectively intermesh with the opposite sides of the annular rack 14, hereinbefore referred to.

The extended ends of the armature-shaft outside of the end walls of the motor-shell are inclosed in extensions or housings 20 21, respectively, which are internally enlarged at the lower sides of the shaft to form oil-cups 22, adapted to contain supplies of oil. In order to convey a continuous supply of oil from the lubricating-cups to the shaft of the armature, rings 23 are mounted loosely upon said shaft and arranged to depend within the respective oil-cups, the rotation of the shaft serving to rotate the rings, and thus carry a continuous supply of oil to the shaft. The rings are suitably spaced apart by means of collars 24 and 25 upon the shaft, as indicated clearly in Fig. 2.

Upon the armature-shaft 11 at a point inside of the end cap 9 is mounted a commutator 26, composed of a plurality of segments insulated from each other and from the shaft in the usual manner and severally connected with the winding of the armature.

The commutator devices are mounted upon the end cap member 9, so as to be removable with the latter. To this end, 27 28 designate fixed studs mounted to project upon the interior of the said end cap, in the present instance at points separated from each other an angular distance of ninety degrees, and upon the inner ends of said studs are mounted brush-holders 29. These brush-holders in the preferred embodiment shown herein consist simply of fixed guides or sockets arranged to extend approximately tangential to the commutator-hub and within which are arranged to slide commutator-blocks 30, of carbon, which bear at their inner ends against the commutator-hub and are held yieldingly in contact therewith by means of springs 31, working through suitable channels or slots 32, formed in the brush-holders, as indicated clearly in the drawings.

The pair of conductors connecting the motor with the source of current are respectively connected with the studs 27 and 28 at points outside of the motor-casing, it being understood that said studs are properly insulated from the casing, as indicated at 33.

34 and 35 designate the conductors through which current is supplied to the several field-windings of the field-magnets, these conductors being conveniently arranged to extend inwardly through the end cap member 9, as indicated clearly in the drawings.

In the present instance, in which the outer casing of the motor forms the spindle member of a wheel-hub, the several conductors 36 37 and 38 39 are brought together and extended out through an aperture or passage 40, formed to emerge axially through the extension or journal portion 6 of the motor-casing, the conductors extending thence to a suitable secondary battery or other source of current-supply.

Referring now more particularly to Figs. 3 and 4, the present embodiment of the shell of the hub comprises a central cylindric portion 41, forming that part of the hub of largest diameter, and tapering side or end walls 42 43, which respectively terminate in reduced cylindric portions 44 45. The end or side wall 42 of the hub is made removable or detachable, to this end being constructed to telescope at its margins, as indicated at 42', within the cylindric portion 41 of the hub and being provided with an annular shoulder 46, which abuts against the end margin of said cylindric portion and limits the extent to which said parts may telescope together. A circumferential series of screws or studs 47 serve to unite said parts rigidly and removably together. That end of the cylindrical central portion 41 of the hub to which the removable end wall 42 is applied is internally enlarged slightly to provide an internal annular shoulder 48, against which is arranged to rest and fit the double annular rack 14, hereinbefore referred to. In the present instance said rack consists simply of a ring provided at its laterally-opposite faces with rack-teeth, as indicated at 49, suitably formed to intermesh with the pinions 18 and 19 of the armature-shaft. The rack-ring is made rigid with the shell of the hub conveniently by means of a circumferential series of screw-studs 50, which may be removed when it is desired to withdraw the motor from the shell of the hub, it being understood that it will be necessary to withdraw the rack with the motor, owing to the manner in which the motor-shaft is intergeared therewith. For convenience of inspection each of the end walls 42 and 43 of the hub is provided with a handhole closed by means of a suitable plate or closure, as indicated at 51. Likewise the shell of the motor is provided with openings 52 and 53, adapted to be respectively brought opposite the openings in the hub-shell, so that the interior of the motor may be inspected without separating the parts. In the present instance the respective ends of the hub-shell are provided with bearing rings and balls forming roller-bearing connections between the journal portions of the motor-casing and the wheel. Referring to Fig. 4, 54 designates a bearing-ring or cup member threaded within the outer end of the shell and confined and locked in position by means of an end-closing plate 55, the inner side of said ring being provided with a groove or race 56, adapted to receive a series of balls 57.

58 designates a coöperating bearing-ring mounted upon the journal portion 5 of the spindle and confined in position by the annular shoulder 5' thereof. The opposite end of the hub is constructed in substantially the same manner, with the exception that the confining and inclosing plate 55' thereof is apertured for the spindle, which at this end is extended for connection with the main frame of the vehicle.

The operation of the device constructed as above described will be entirely obvious and need not, therefore, be detailed.

A motor constructed in accordance with this invention possesses numerous and important advantages. For example, by reason of the fact that the drive-shaft which transmits the power from the motor to the driven member is engaged with the annular racks at two diametrically opposite points the driving moment is imparted to the driven member in an equalized manner, which avoids all tendency of the parts to create undue friction by reason of the greater stress upon one bearing than upon another, and this very materially increases the relative efficiency of the motor. Another important advantage incident to the construction and arrangement described is that the motor may be made extremely compact and located concentrically with the axis of rotation of the driven element, thereby imparting its driving moment to the latter with a minimum amount of transmitting mechanism, and this further increases the relative efficiency. In the case of traction-wheels—such, for example, as automobile-wheels and the like—the motor finds one of its most important applications, since in such case the power is applied in the most direct manner possible, and in the case of a vehicle having more than a single propelling or traction wheel each traction-wheel may obviously be supplied with a motor and independently controlled. In this connection it is to be noted that although the driven member is in the present instance a traction-wheel, yet the motor may obviously be applied to drive other mechanisms and is in no sense limited to this particular application. It may be further noted in this connection that while in the present instance the external member is the moving member by a simple reversal the member carrying the duplex racks might be made stationary and the driving moment imparted through a connection with the internal frame or casing, which would in such case become the rotating member. These and similar mechanical expedients are to be understood as within the spirit and scope of the present invention. It will therefore be understood from the foregoing description that the details of construction may be modified without departing from the spirit of the invention. I do not, therefore, wish to be limited to the details of construction shown and described herein, except to the extent that the same are made the subject of specific claims.

I claim as my invention—

1. In an electric motor, the combination of a rotary armature, a drive-shaft rotating therewith, a pinion on each end of said shaft and an annular driven member provided with duplex annular racks respectively engaged with said pinions in diametrically opposite relation, whereby the driving moment of the motor is simultaneously imparted to said driven element through both pinions.

2. In an electric motor, the combination of a main drive-shaft, an armature mounted thereon, a pinion upon said shaft at each side of said armature, and a driven member provided with duplex annular racks arranged to encircle said armature; said racks being severally engaged with the respective pinions of the armature-shaft in diametrically opposite relation to each other whereby the driving moment of the motor is simultaneously imparted to said driven element through both pinions.

3. In an electric motor, the combination of a relatively stationary frame, a main drive-shaft journaled in said frame and provided with a pair of driving-pinions, an armature mounted upon said drive-shaft between said pinions, a series of field-pieces upon said frame in coöperative relation to said armature, and a driven member comprising duplex parallel annular racks encircling said armature exteriorly of the stationary frame, and having its racks operatively engaged with the respective pinions of the drive-shaft in diametrically opposite relation whereby the driving moment of the armature is imparted to the driven member through both pinions simultaneously and in the same direction.

4. In an electric motor, the combination of a relatively stationary frame, constituting an armature-housing, a main drive-shaft journaled in said frame and provided with a pair of driving-pinions, an armature mounted upon said drive-shaft between said pinions, a series of field-pieces upon said frame in coöperative relation to said armature, and a driven member comprising duplex parallel annular racks encircling said armature exteriorly of the stationary frame, and having its racks operatively engaged with the respective pinions of the drive-shaft in diametrically opposite relation whereby the driving moment of the armature is imparted to the driven member through both pinions simultaneously and in the same direction.

5. In an electric motor, the combination of a relatively stationary main frame provided with bearing-supports, a main drive-shaft journaled in said frame and provided with a pair of driving-pinions, an armature mounted upon said drive-shaft between said pinions, a series of field-pieces upon said frame in coöperative relation to said armature, and an outer driven member operatively engaged with the bearing-supports of the relatively stationary frame comprising duplex parallel annular racks encircling said armature exteriorly of the stationary frame, and having its racks operatively engaged with the respective pinions of the drive-shaft in diametrically opposite relation whereby the driving moment of the armature is imparted to the driven member through both pinions simultaneously and in the same direction.

6. In an electric motor, the combination of a relatively stationary frame provided with integral oppositely-disposed external projections constituting journals, a main drive-shaft journaled in said frame and provided with a pair of driving-pinions, an armature mounted upon said drive-shaft between said pinions, a series of field-pieces upon said frame in coöperative relation to said armature, and an outer driven member journaled upon said journal projections of the main frame, comprising duplex, parallel, annular racks encircling said armature exteriorly of the stationary frame, and having its racks operatively engaged with the respective pinions of the drive-shaft in diametrically opposite relation whereby the driving moment of the armature is imparted to the driven member through both pinions simultaneously and in the same direction.

7. In an electric motor, the combination of a relatively stationary frame provided with integral oppositely-disposed external projections constituting journals; a main drive-shaft journaled in said frame and provided with a pair of driving-pinions, an armature mounted upon said drive-shaft between said pinions, a series of field-pieces upon said frame in coöperative relation to said armature, and an outer driven member journaled upon said journal projections of the main frame, comprising duplex, parallel, annular racks encircling said armature exteriorly of the stationary frame, and having its racks operatively engaged with the respective pinions of the drive-shaft in diametrically opposite relation whereby the driving moment of the armature is imparted to the driven member through both pinions simultaneously and in the same direction.

8. In an electric motor, the combination of a relatively stationary motor-casing constituting a substantially complete inclosure, a series of field-magnets arranged upon the interior of said casing, an armature journaled within the casing and a commutator mechanism mounted upon the interior of the casing at one end of said armature, that portion of the wall of the casing which supports the commutator mechanism being made in the form of a removable end cap through which the motor mechanism is insertible and removable, substantially as described.

9. In combination with a wheel, means for propelling the same comprising an annular double driving-rack mounted concentrically with the axis of rotation of said wheel, a drive-shaft arranged diametrically of said rack and provided at each end with a driving-pinion engaged with the rack, and an armature arranged to rotate said drive-shaft.

10. In combination with a wheel, means for propelling the same comprising a rack-ring having two series of rack-teeth upon its laterally-opposite sides and mounted concentrically with the axis of rotation of said wheel, a drive-shaft arranged to extend diametrically across and diagonally through said rack-ring and provided at each end with a driving-pinion engaged with the respective series of racks, and an armature mounted upon said shaft.

11. In combination with a wheel having a hollow shell-like hub, a double driving-rack mounted within said hub concentrically with the axis of rotation of the wheel, a drive-shaft arranged diametrically of said rack and provided at each end with a driving-pinion engaged with the rack, a motor-armature mounted upon said drive-shaft within the hub, field-magnets supported upon the wheel in coöperative relation with said armature, and means for supplying electric current to said motor.

12. In combination with a wheel, having a hollow shell-like hub, means for propelling the same comprising an annular double rack mounted upon the interior of the hub concentric with the axis of rotation of the latter, a drive-shaft arranged to extend diametrically and diagonally across said annular rack and provided at each end with a driving-pinion engaged with the latter, an armature mounted rigidly upon said drive-shaft, a motor-casing inclosing said armature within the hub-shell and supporting a series of field-magnets in coöperative relation to the armature, said armature-casing being rigidly secured to the interior of the hub, armature-shaft bearings formed in each end of said armature-casing, a commutator-hub mounted upon said armature-shaft adjacent to one of the end walls of the casing, commutator-brushes supported upon the end wall and operatively engaging said commutator, and electrical connections connected with the windings of the field-magnets and commutator-brushes respectively and extending out of the wheel-hub through a non-rotated part of, or upon the wheel-axle, as and for the purpose set forth.

ALBERT B. HOLSON.

Witnesses:
FREDERICK C. GOODWIN,
ALBERT H. GRAVES.